3,574,161
MANUFACTURE OF POLYMERIC COMPOSITIONS
Robert P. Campion, Walsall, and James F. Yardley, Little Aston, near Sutton Coldfield, England, assignors to The Dunlop Company Limited, London, England
No Drawing. Filed Feb. 28, 1968, Ser. No. 708,764
Claims priority, application Great Britain, Mar. 28, 1967, 10,411/67
Int. Cl. C08f 47/20
U.S. Cl. 260—34.2          9 Claims

ABSTRACT OF THE DISCLOSURE

Method of preparing a solution of a polymeric material in an organic solvent which comprises mixing (A) a dispersion of polymeric particles in water, in which the particles are dispersed with the assistance of an ionic dispersing agent, with (B) a dispersion of the organic solvent in water, in which the solvent has been dispersed using a high degree of shear with the assistance of a dispersing agent of opposite polarity to the first-mentioned dispersing agent, and separating the water layer thus formed from the organic solvent layer containing the polymeric material.

---

This invention relates to the manufacture of polymeric compositions and to products obtained therefrom.

According to the present invention, a method of preparing a solution of a polymeric material in an organic solvent, comprises mixing (A) a dispersion of polymeric particles in water, in which the particles are dispersed with the assistance of an ionic dispersing agent, with (B) a dispersion of the organic solvent in water, in which the solvent has been dispersed using a high degree of shear with the assistance of a dispersing agent of opposite polarity to the first-mentioned dispersing agent, and separating the water layer thus formed from the organic solvent layer containing the polymeric material.

It is believed that when the two dispersions are mixed, the dispersed particles of polymeric material and solvent are brought into intimate contact and the oppositely charged dispersing agents on the surfaces of the dispersed particles neutralise each other and thus destabilise the boundaries of the polymeric material and the solvent particles with respect to water. The polymeric material thus becomes solvated and a solution is formed which separates quickly from the water. Preferably the polymeric dispersion (A) is mixed with the solvent dispersion (B) using a high degree of shear although this is not essential.

The organic solvent solution may be separated from the water by known techniques. If required it may be washed thoroughly and dried with respect to the water.

The dispersion (B) may if desired comprise a solution of a rubber in the solvent and in this case the product of the method of this invention may be a solution of a blend of the rubber and the polymeric material. For instance, a solution of natural rubber in hexane and an aqueous dispersion comprising a styrene-butadiene rubber latex gives a blend of the two rubbers as can be demonstrated by infrared spectroscopic techniques.

Preferably, the dispersing agent for the polymeric material is an anionic soap while the dispersing agent for the solvent is a cationic soap, although these polarities may be reversed if desired. The amount of the dispersing agent used in dispersing the solvent is usually adjusted so that it is equivalent, with respect to polarity, to the amount of the dispersing agent coating the polymer particles.

A suitable dispersing agent for the dispersion of the polymeric particles in water is potassium dresinate, and a suitable dispersing agent for the dispersion of the solvent in water is dodecyl pyridinium chloride or octadecyl trimethyl ammonium chloride (e.g. Arquad 18). Arquad 18 is a 50 percent solution in isopropanol of octadecyl trimethyl ammonium chloride available from Armour Hess Chemicals Ltd.

The dispersion of polymeric particles in water (A) is preferably a natural rubber latex or a synthetic rubber latex, however, the polymeric material contained therein should be capable of being dissolved in the organic solvent by normal mixing techniques. Latices of many types may be brought into solution by the method of the invention.

Typical synthetic rubbers which can be used are homopolymers of butadiene and chloroprene, interpolymers of butadiene or isoprene with styrene, acrylonitrile, alphamethyl styrene, methyl methacrylate, methyl isopropenyl ketone or vinyl pyridine. Homopolymers and interpolymers of vinyl acetate may also be utilised. It is to be understood that these polymers may contain an extender oil. A preferred material is a styrene-butadiene rubber.

According to one feature of the invention a filler is dispersed in an organic solvent by mixing with a high degree of shear, the resulting pseudodispersion is dispersed in water with a high degree of shear in the presence of an ionic dispersing agent and this dispersion (B) is then mixed using a high degree of shear with the dispersion (A) of polymeric material in water as identified above.

By this means it is possible to produce a solution comprising both polymeric material and filler in an organic solvent. However, as indicated below, such solutions comprising fillers may be produced by other means within the scope of the present invention.

The meaning of "mixing with a high degree of shear" as used in this specification, (a) as applied to the dispersion of solvent in water means the amount, rate and type of work needed to produce small solvent globules homogenously dispersed in water, (b) as applied to the pseudodispersion of filler particles in solvent prior to production of a filler/solvent dispersion in water means the continuation of mixing until the amount, rate and type of work are sufficient to break down the filler agglomerates, which in the case of filler particles of small size, e.g. powdered carbon black, results in thixotropic thickening of the pseudodispersion, and (c) as applied to the mixing of (A) an aqueous dispersion of polymeric particles in the presence of an ionic dispersing agent, with (B) an aqueous dispersion of a pseudodispersion of filler particles in a solvent, in the presence of an ionic dispersing agent of opposite charge, means the work needed to bring about an intimate contact of the oppositely charged dispersed particles quickly and efficiently.

A typical mixing apparatus which can be used in the method of the invention is described and claimed in British patent specification No. 734,571. An apparatus of this type is obtainable under the name Polytron or Ultra Turrax and consists of a bladed rotor within a cage. This apparatus can be used to impart a high degree of shear to the material being mixed. An alternative mixing apparatus is a pump-type homogeniser in which the mixture is forced under pressure through a small orifice, or an ultrasonic mixing apparatus.

The organic solvent that is employed depends on the particular polymeric material that is being treated and examples of suitable solvents, depending on the polymer, are aliphatic and aromatic hydrocarbons such as hexane, n-decane, cyclohexane and benzene. Other solvents which may be used are chloroform and carbon tetrachloride. The preferred organic solvent for the purposes of the present invention is a petroleum hydrocarbon.

The filler can be any of the well-known types of reinforcing fillers such as carbon black (pelletised or unpelletised), silica, calcium silicate and aluminum silicate. Alternatively, non-reinforcing fillers and resins may be employed. In the case of organic or resin-type fillers which are soluble in organic solvents, these may be dissolved in the solvent to form a solution which is used as above to provide a dispersion (B) in water. The filler can be employed in a wide range of amounts, although usually the amount will be from 10 percent to 150 percent of the weight of the polymeric material. When the composition is to be used to manufacture pneumatic tyres, then amounts of reinforcing filler of from 40 percent to 60 percent by weight of the polymer in the solution are normally employed. The preferred filler for the purpose of the present invention is carbon black.

As indicated above, one method of producing a solution comprising polymer compounded with filler involves addition of the filler to the organic solvent prior to solvation of the polymer. However, it is possible to prepare a similar solution by other methods.

Thus, as described in the complete specification filed in connection with U.K. patent applications Nos. 28,035/63 and 18,740/64 (cognate), a filler in unpelletised form may be added to the polymer solution and mixed therein with a high degree of shear. As described in U.K. patent application No. 18,739/64, a filler may be mixed with an organic solvent for the polymer with a high degree of shear and the dispersion thus produced mixed with the polymer solution.

Other rubber compounding ingredients such as sulphur, free-radical curing agents, vulcanization accelerators, antioxidants, antiozonants, extender oils and processing oils can be incorporated into the polymer by the method of the invention. Where a filler is included in a composition of the invention, some of these ingredients may be introduced along with the filler.

By the present invention it is possible to produce a solution of a polymer which can be used as such, in certain applications, for example as an adhesive. Adhesives based on natural and synthetic rubber solutions prepared by the method of the present invention have tack properties substantially equal to those prepared by conventional methods. It is also possible by the present invention to produce a fully compounded solution which can be used alone or dried to give a reinforced compound.

Hitherto, masterbatches containing reinforcing fillers prepared from latices or solutions of the polymer had to be mechanically worked on a mill or in an internal mixer such as a Banbury mixer after removal of the water or the solvent in order that the composition should have acceptable physical properties when vulcanized. The present invention overcomes this problem. The method of the present invention produces a composition which after vulcanization has acceptable tear strength, resilience and other properties, and the values of these properties are substantially equivalent to those of compositions produced by mechanically working the rubber composition in an internal mixer such as a Banbury mixer or on a mill.

The polymeric compositions can be used as coating materials or as adhesives, e.g. for textile fabrics. If the viscosity of the composition is not suitable for a coating composition it can easily be adjusted by adding or removing solvent. The mixed solution can be applied to a textile fabric, for instance by spreading using a doctor blade, and the solvent can be removed to give a coated fabric. The coating may be vulcanized, or two coated fabrics can be contacted with the polymer composition coatings in contact and the assembly vulcanized to produce a composite fabric. The compositions can also be used for coating individual textile filaments or cords by a solution spinning technique in which the filament or cord is passed through a spinnerette orifice. Individual filaments or cords so coated can be formed into a non-woven fabric and the composition may then be vulcanized to improve the strength of the fabric. Metal wires or fabrics can be coated with the polymeric compositions and metal or other surfaces may also be coated. A non-woven fabric or a fibre-reinforced polymer composition can be made by mixing staple fibres with the polymeric material during preparation of the polymeric composition. Such a non-woven fabric could be used as a member for a tyre sidewall, as a base for artificial leather, as a carpet underlay or as an upholstery component. A rubber thread, if desired reinforced with a filler, can be made from the polymer compositions by a solution spinning process. Internal or concave surfaces, as for example in cans and containers, can be lined by spinning the composition on to the surfaces.

The methods of the present invention are quicker, cheaper, more flexible and easier to set up and operate than those based on conventional mixing machinery such as mills and internal mixers.

The invention is illustrated in the following examples:

EXAMPLE I

To illustrate the practice of the invention a styrene-butadiene rubber (SBR) tread compound of one composition was prepared by various methods. This composition was formed from the following ingredients:

|  | Part(s) by weight | | | |
| --- | --- | --- | --- | --- |
|  | W | X | Y | Z |
| SBR 1500 | 100.0 | 100.0 | 100.0 | 100.0 |
| Sulphur | 1.75 | 1.75 | 1.75 | 1.75 |
| N-cyclohexyl-2-benzthiazyl sulphenamide | 1.00 | 1.00 | 1.00 | 1.00 |
| Stearic acid | 1.00 | 1.00 | 1.00 | 1.00 |
| Zinc oxide | 3.00 | 3.00 | 3.00 | 3.00 |
| Antioxidant | 0.75 | 0.75 | 0.75 | 0.75 |
| Antiozonant | 0 | 0 | 0 | 0.75 |
| HAF Black | 50.0 | 50.0 | 50.0 | 50.0 |

The antioxidant was N-phenyl-N'-isopropyl-p-phenylene diamine and the antiozonant was 6-ethoxy-2,2,4-trimethyl-1,2-dihydro quinoline.

In method W the carbon black and the other compounding ingredients were added to the rubber by a conventional method in an internal mixer and on a mill.

In method X a solution of SBR in 80 percent hexane/20 percent pentane solvent was prepared by a procedure embodying the present invention. The aqueous dispersion (A) comprised rubber particles dispersed in water using potassium dresinate as the anionic soap. The aqueous dispersion (B) comprised the organic solvent dispersed in water with high shear using octadecyl trimethyl ammonium chloride (Arquad 18–50 percent) as the cationic soap. The dispersions were mixed without high shear and separated in two or three minutes into aqueous and organic solution layers. After separation of the aqueous layer, the carbon black and the other compounding ingredients were added to the SBR dissolved in the organic solvent by mixing with a high degree of shear using an Ultra Turrax High Speed Stirrer. The solvent was stripped off to obtain the dry composition.

In method Y high shear was used throughout. The organic solvent and soaps were as in method X. Carbon black and the other compounding ingredients were dispersed in the solvent and the resulting pseudodispersion was dispersed in water in the presence of the cationic soap. The latex was finally added and the whole mixed to produce a fully compounded solution which separated out as before. The organic solvent was stripped off to obtain the dry compound. By this method it was thus not necessary to add the carbon black to the solution of the rubber in the organic solvent.

In method Z the rubber was dissolved directly in hexane. The carbon black and the other compounding ingredients were dispersed and dissolved therein by the technique described in method X.

The physical properties, cure times, etc., of trade stocks prepared by these methods are shown in the following table:

TABLE

|  | W | X | Y | Z |
|---|---|---|---|---|
| Cure time at 148° C.(min) | 55 | 30 | 85 | 55 | 65 |
| Tensile strength (kg./cm.²) | 250 | 81 | 79 | 172 | 171 |
| 300% modllus (kg./cm.²) | 150 | 70 | | 135 | 107 |
| Elongation at break (percent) | 447 | 360 | 275 | 375 | 470 |
| Tripsometer: | | | | | |
| °BS hardness | 67.5 | 76.0 | 76.5 | 75.0 | 73.0 |
| Percent Resilience at 50° C | 52.5 | 40.0 | 34.5 | 45.0 | 46.0 |
| ASTM tear strength ((kg./tp.): | | | | | |
| At 21° C | 11.7 | 12.4 | 10.6 | 12.0 | 14.8 |
| At 100° C | 7.8 | 5.1 | 4.8 | 7.1 | 7.4 |

It will be observed that the method of the present invention (X and Y) results in compositions which, when vulcanized, have physical properties substantially equal to those of compositions prepared by carrying out the mixing stage in an internal mixer and on a mill (method W) or by dissolving the rubber directly in a solvent and mixing the compounding ingredients into the solution (method Z). Thus, the method of the present invention produces a rubber composition having properties comparable with previously used methods but in a more convenient and economical manner.

EXAMPLE II

This example illustrates a comparison of pressure-sensitive adhesive compositions prepared by the method of the present invention and by a conventional method.

Pressure-sensitive adhesive compositions were made up from the following formulations, all values being in grammes unless otherwise stated.

|  | Conventional method | Method of invention |
|---|---|---|
| SBR 1500 | 100 | 0 |
| SBR 1500 latex including anionic dispersing agent, ml | 0 | 427 |
| Resin | 125 | 125 |
| Polyisobutylene tackifier | 20 | 20 |
| Antioxidant | 100 | 1 |
| Solvent, ml | 560 | 560 |
| Water, ml | 0 | 2500 |
| Cationic dispersing agent, ml | 0 | 11.25 |

The SBR 1500 used in the conventional method was available under the trade name Cariflex 1011. The SBR 1500 latex containing an anionic dispersing agent had the same styrene content as the SBR used in the conventional method and was available under the trade name Intol 1006 latex. 427 ml. of this latex contained 100 gm. of the rubber. The resin was a glycerol ester-stabilised resin of a rosin acid available under the trade name Pentalyn H ex Hercules Powder Company. The polyisobutylene was available under the trade name Polyvis 30. The antioxidant was a substituted phenol available under the trade name Nonox WSL ex I.C.I. The solvent was an SBP 2 hydrocarbon fraction and the amount employed was sufficient to bring the total solids contents of the resulting solutions to 38.5 weight percent. The cationic dispersing agent was a 50 percent solution in isopropanol of octadecyl trimethyl ammonium chloride available under the trade name Arquad-18 ex Armour Hess Chemicals Ltd.

The procedure in the conventional method was as follows. The SBR 1500 was passed twice through a mill and then dry-loaded into a hopper. Enough solvent was added to wet the rubber which was then mixed for 2 hours to form a dough. The resin, polyisobutylene and antioxidant were then mixed in and the mixture was diluted with the remaining solvent, all over a period of 3 hours.

The procedure in the method of the invention was as follows. The resin, polyisobutylene and antioxidant were dissolved in the solvent and the solution was added to a mixture of the water and the cationic dispersing agent with stirring at a fairly high speed on an Ultra Turrax mixer to form a cationic aqueous emulsion. After formation of the emulsion the stirring was continued for a further 1–2 minutes at this high shear and then the stirring rate was lessened whereupon the SBR 1500 latex was slowly added. The stirring was stopped after a further 5–10 seconds and the solution gradually separated out. The water layer was removed and the solution was washed with water.

Specimens of the rubber solution prepared as described in the immediately-proceeding paragraph were centrifuged to remove all water and their tack properties were compared with those of the rubber adhesive prepared by the conventional method, on a standard Pickup tackmeter. The results are given below.

The tack of the conventionally prepared adhesive was 354±20 gm. and that of the adhesive prepared by the method of the present invention was 294±18 gm., so that, $$\frac{\text{Tack of the inventive adhesive}}{\text{Tack of the conventional adhesive}} \times 100 = 83$$

This result shows that an adhesive prepared by the method of the invention has tack properties which are comparable with those of a conventionally prepared adhesive.

Since rubbers having different trade names were used in the above experiments, further experiments were performed at a later date to show that this difference did not affect the tack results. An adhesive was prepared by the above conventional method using the rubber which had been used in the above method of the invention, i.e. that available under the trade name Intol 1006. The tack properties of this adhesive were compared in fresh tests with those of the adhesive prepared by the conventional method using the rubber available under the trade name Cariflex 1011.

The tack of the adhesive based on Cariflex 1011 was 470 gm. and that of the adhesive based on Intol 1006 was 367 gm., so that, $$\frac{\text{Tack of adhesive based on intol 1006}}{\text{Tack of adhesive based on cariflex 1011}} \times 100 = 78$$

A comparison of this result with the result of 83 obtained in the first set of experiments shows that the affect on the tack properties of using the different commercially available rubbers in the first set of experiments was negligible.

Having now described our invention, what we claim is:

1. A method of preparing a solution of a rubber in an organic solvent, which comprises mixing (A) a dispersion of natural or synthetic rubber particles in water, in which the particles are dispersed with the assistance of an ionic dispersing agent, with (B) a dispersion of the organic solvent in water, in which the solvent has been dispersed using a high degree of shear with the assistance of a dispersing agent of opposite polarity to that of the first-mentioned dispersing agent in (A) being equivalent to the amount of dispersing agent in (B) with respect to polarity and separating the water layer thus formed from the organic solvent layer containing the rubber.

2. A method according to claim 1, in which the dispersing agent in (A) is an anionic soap and the dispersing agent in (B) is a cationic soap.

3. A method according to claim 1 in which the polymeric material is a styrene-butadiene rubber.

4. A method according to claim 1 in which (B) includes a filler and is made by dispersing the filler in the organic solvent by mixing with a high degree of shear and dispersing the resulting pseudodispersion in water in the presence of the ionic dispersing agent by mixing with a high degree of shear.

5. A method according to claim 4 in which the filler is a carbon black.

6. A method according to claim 4 in which the amount of filler employed is from 10 to 150 percent of the weight of the rubber.

7. A method according to claim 1 in which the solvent is a petroleum hydrocarbon fraction.

8. A method according to claim 1 in which at least one rubber compounding ingredient is mixed with the polymeric material.

9. A method according to claim 1 in which (A) is mixed with (B) using a high degree of shear.

References Cited

UNITED STATES PATENTS 3,046,244  7/1962  Hunter et al. _____ 260—34.2

MORRIS LIEBMAN, Primary Examiner

S. L. FOX, Assistant Examiner

U.S. Cl. X.R.

260—33.6